United States Patent [19]
Groult et al.

[11] 3,899,356
[45] Aug. 12, 1975

[54] POROUS ELECTRODE FOR A FUEL CELL AND METHOD OF MAKING SAME

[75] Inventors: Pierre Groult, Longjumeau; Francois Hubert, Paris; Jacques Daunay, Versailles; Pierre Bono, Morangis, all of France

[73] Assignee: Societe Generale de Constructions Electriques et Mecaniques Alsthom & Cie, France

[22] Filed: Jan. 24, 1974

[21] Appl. No.: 436,330

[30] Foreign Application Priority Data
Jan. 24, 1973 France .................. 73.02454

[52] U.S. Cl. .................. 136/120 FC; 136/86 D
[51] Int. Cl. .................. H01m 35/00
[58] Field of Search .......... 136/120 FC, 86 D, 86 R

[56] References Cited
UNITED STATES PATENTS

| | | | |
|---|---|---|---|
| 3,442,715 | 5/1969 | Yee et al. | 136/120 FC |
| 3,520,730 | 7/1970 | Puffer | 136/86 D |
| 3,660,165 | 5/1972 | Palmer | 136/86 D |

*Primary Examiner*—John H. Mack
*Assistant Examiner*—H. A. Feeley
*Attorney, Agent, or Firm*—Craig & Antonelli

[57] ABSTRACT

A porous electrode for a fuel cell comprising a catalytic layer comprised of a mixture of active carbon and teflon, a stop layer comprised of teflon deposited on the catalytic layer, and current collector means including a grid compressed on the two preceding layers, so that it crosses through the stop layer and penetrates into a part of the thickness of the catalytic layer. The electrode has a porosity in the order of 50%.

23 Claims, 3 Drawing Figures

POROUS ELECTRODE FOR A FUEL CELL AND METHOD OF MAKING SAME

The present invention concerns a porous electrode for a fuel cell and more particularly for a cell using liquid fuel such as methanol and a gaseous combustive such as oxygen or air. The invention also concerns a method for producing such an electrode.

Electrodes made up mainly by a catalytic layer arranged on a support, one of whose faces is in contact with an electrolyte containing a fuel in the dissolved state, whereas the other face is in contact with a combustive, are known. Current collectors are arranged in contact with the faces and provide for the directing of the ions resulting from the electrochemical process.

Such electrodes have, nevertheless, a certain number of disadvantages and more particularly it is necessary to implement the disadvantages of gaseous combustives at high pressures. Moreover, such electrodes have low potentials with values that are very far from the optimum values and that which, for a given electrolyte, correspond to the maximum performance of the storage cell as a whole.

The present invention enables such disadvantages to be overcome and it has for its object a porous electrode having interesting characteristics, particularly from the conductivity and potential point of view of the electrode, which is easy to produce and has a moderate cost.

The invention therefore has as its aim a porous electrode for a fuel cell comprising:

a catalytic layer comprised of a mixture of a catalyst and of a polymer, more particularly polytetrafluorethylene;

a layer called a stop layer arranged on one of the faces of the catalytic layer and made of said polymer, the stop layer as well as the catalytic layer having an open porosity comprised between about 40 and about 60% and preferably equal to about 50%;

a current collector means including a grid made of an electronically conductive material and a chemically inert material; and a separator means comprised of a fibrous tissue or layer arranged on the other face of the catalytic layer;

that electrode being characterized in that the said current collector crosses through the whole of the stop layer and penetrates into a part of the thickness of said catalytic layer.

The invention concerns also a method for producing a porous electrode in which, successively;

a mixture of catalyst such as carbon in a proportion by weight between about 40 and about 90% and polytetrafluorethylene in a proportion by weight between about 10 and about 60% previously dispersed in dibutylphthalate or the like, is deposited on a sheet of aluminum;

a part drying of the deposit is effected;

a stop layer of polytetrafluorethylane previously dispersed in dibutylphthalate is deposited on the preceding layer;

a drying of that deposit is effected;

a grid is arranged on the preceding layer and it is compressed at a pressure comprised between about 500 and about 2,500 kg/sq. cm.; and a sintering of the assembly of layers by heating in a neutral or reducing atmosphere to a temperature of about 350° to about 420°C. maintained from about 5 to 60 minutes is effected.

Other characteristics and advantages of the invention will become apparent from the following description, given by way of a purely illustrating example having no limiting character, with reference to the accompanying drawings and diagrams, in which.

It must be understood that in these figures, the thickness of the various layers has purposely beeen exagarated.

Figure 1:
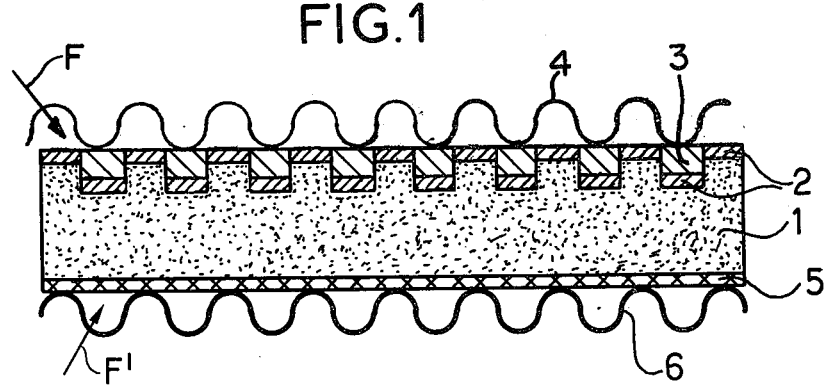
FIG. 1 shows a porous electrode according to the invention.

With reference to FIG. 1, a porous electrode according to the invention comprises a porous catalytical layer 1 constituted by a mixture of active carbon and of polytetrafluorethylene (PTFE) in proportions of about 40 to about 90% by weight and of about 60 to about 10% by weight, respectively. On layer 1 is arranged a layer 2, called the stop layer, also consisting of PTFE. A current collector means 3, consisting for example of a grid or expanded metal element made of nickel or stainless steel is interlaced with the layers 1 and 2 as shown. A metal cathode collector 4 (made of a metal such as nickel or stainless steel) for providing the electric connection with the neighboring electrode (not shown) has also been shown, it being understood that the electrode described forms a part of an assembly of bipolar electrodes constituting the fuel cell, such a compact assembly being of the filter-press type.

Against the other face of the layer 1 is arranged a separator 5 consisting of an airy tissue of fibers such as regenerated cellulose or asbestos; whereas another metal collector 6 including a catalytic layer provides the connection with another neighboring electrode (not shown).

One of the faces of the electrode thus shown is fed in the direction of the arrow F with methanol and an electrolyte consisting of a potassium hydroxide or an alkaline carbonate solution, whereas the other face is fed within the direction of the arrow F' with air.

Figure 2A:
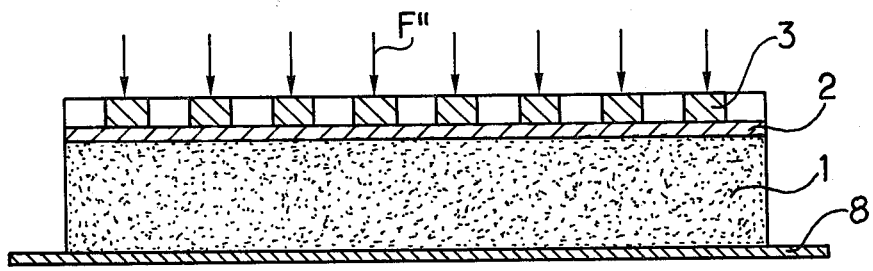
FIGS. 2a and 2b illustrate the implementing of the method for producing an electrode according to the invention.
Figure 2B:
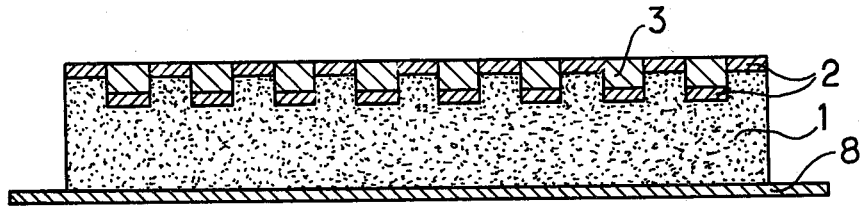

FIGS. 2a and 2b illustrate further the implementing of the method for producing a porous electrode according to the invention.

According to FIG. 2a, the catalytic layer 1 is deposited in the first instance on a sheet of aluminum 8, using a well known serigraphic method, keeping the deposit to a determined thickness. For that purpose, the active carbon and the PTFE are previously dispersed in dibutylphthalate, water or the like liquid diluent, so as to obtain an oily ink. After partial drying, a porous layer 1, on which is deposited the stop layer 2 by a similar technique, is obtained. After further drying, the expanded metal part 3 is arranged on the assembly as shown, then the assembly is subjected to a pressure of 1,900 kg/sq. cm., indicated by the arrows F". FIG. 2b shows that such a pressure has the effect of making the expanded metal part penetrate inside the whole of the thickness of the stop layer 2 like a punch tool and inside a fraction or portion of the thickness of the catalytic layer 1, as shown; thus providing an excellent electric contact. Such a pressure has, moreover, the effect of releasing the aluminum sheet 8. To great advantage, a lubricant such as a fluocarbonated oil which makes the sliding of the layers into the gaps in the expanded metal part 3 easier, may be incorporated in the inks used for forming the layers 1 and 2.

Subsequent to that compression phase of the method, a sintering of the assembly is effected in a neutral or reducing atmosphere consisting of nitrogen or a mixture of nitrogen and hydrogen at a temperature in the order of 380°C. for 30 minutes.

An electrode having approximately an overall thickness of 100 to 200 microns, a porosity of 50% and a conductivity of 0.2 to 0.1 ($\Omega \times$ cm) for the catalytic layer is thus obtained.

The electrodes thus produced may be installed as previously described to constitute a filter-press type cell.

It must be understood that this further assembly will be effected providing for the separators 5 as well as for the collectors 4 and 6 (FIG. 1).

It will be observed, moreover that such a porous electrode makes it possible to feed the cell with air at a pressure of a few millibars; it being very easy to do this by means of a simple fan.

It will also be observed that the stop layer 2 prevents the methanol from crossing through the electrode and evaporating, the temperature of the assembly being in the order of 75°C.

It must be understood that the invention is in no way limited to the embodiment described and illustrated, which has been given only by way of an example.

More particularly, without going beyond the scope of the invention, details may be modified, certain arrangements may be changed or certain means may be replaced by equivalent means.

What is claimed is:

1. A porous electrode for a fuel cell comprising:
   a catalytic layer containing a mixture of a catalyst and of a polymer;
   a stop layer arranged on one of the faces of the catalytic layer and consisting essentially of said polymer, the stop layer and the catalytic layer having an open porosity of from about 40 to about 60%; and
   current collector means made of an electronically conductive and chemically inert material;
   said electrode being characterized in that the current collector means crosses through portions of the whole of the stop layer and penetrates into portions of the catalytic layer.

2. The electrode of claim 1, further comprising a separator layer comprising a fibrous tissue arranged on the other face of the catalytic layer.

3. The electrode of claim 1, wherein said current collector means is a reticulated member having a plurality of interconnected portions that extend through said stop layer into said catalytic layer.

4. The electrode of claim 1, wherein said collector means is a metallic grid having a plurality of elements spaced from each other in a predetermined pattern that extend through said stop layer into said catalytic layer.

5. The electrode of claim 4, wherein said grid is made of two sets of parallel extending metallic elements, which intersect each other.

6. The electrode of claim 4, wherein the grid is made of nickel or stainless steel.

7. The electrode of claim 1, wherein the polymer is a polyfluorinated polyolefin.

8. The electrode of claim 1, wherein the catalyst is powdered active carbon and said polymer is polytetrafluorethylene.

9. The electrode of claim 1, wherein the collector means penetrates into said catalytic layer with an outer surface that is level with and that forms a portion of an outer surface of one face of the electrode and an inner surface that contacts portions of the stop layer disposed within said electrode, other portions of said stop layer forming the remaining portions of the outer surface of said one face of the electrode.

10. The electrode of claim 1, wherein the catalytic layer is a sintered porous member.

11. A method for preparing a porous electrode for a fuel cell which comprises:
   a. depositing a mixture of a catalyst in a proportion by weight comprised between about 90 and about 40% and of a polymer in a proportion by weight comprised between about 10 and about 60%, dispersed in a liquid volatile diluent, on a metal sheet;
   b. partial drying the deposit;
   c. depositing a stop layer consisting essentially of said polymer diluted in the liquid diluent on the catalytic layer;
   d. drying of the stop layer;
   e. arranging a current collector means on the stop layer and compressing the collector means at a pressure from about 500 to about 2,500 kg/sq. cm to form an assembly of layers and collector means; and
   f. sintering of the assembly by heating at an elevated temperature.

12. The method of claim 11, wherein the catalyst is active carbon and the polymer is a polyfluorinated polyolefin.

13. The method of claim 12, wherein the polymer is polytetrafluorethylene.

14. The method of claim 13, wherein the assembly is sintered in a neutral or reducing atmosphere at a temperature of from about 350°C. to about 420°C. for about 5 to about 60 minutes.

15. The method of claim 11, wherein said diluent is dibutylphthalate.

16. The method of claim 11, wherein a lubricant is used jointly with the diluent.

17. The method of claim 16, wherein the lubricant is a fluorocarbon oil.

18. The method of claim 1, wherein the metal sheet is aluminum.

19. An electrochemical storage cell comprising at least one electrode according to claim 1.

20. The electrode of claim 1, wherein the stop layer consists of polytetrafluorethylene.

21. The electrode of claim 1, wherein the stop layer is free of catalyst.

22. A method of claim 11, wherein said stop layer consists of polytetrafluorethylene diluted in dibutylphthalate.

23. The method of claim 11, wherein the stop layer is free of catalyst.

* * * * *